(12) United States Patent
Poggiani et al.

(10) Patent No.: US 12,523,679 B2
(45) Date of Patent: Jan. 13, 2026

(54) DEPTH DETECTOR SYSTEMS

(71) Applicant: Cascade Corporation, Fairview, OR (US)

(72) Inventors: Mauro Poggiani, Caldiero (IT); Angelo Gambaretto, Ilarione (IT)

(73) Assignee: Cascade Corporation, Fairview, OR (US)

( * ) Notice: Subject to any disclaimer, the term of this patent is extended or adjusted under 35 U.S.C. 154(b) by 150 days.

(21) Appl. No.: 18/481,073

(22) Filed: Oct. 4, 2023

(65) Prior Publication Data
US 2024/0110946 A1 Apr. 4, 2024

Related U.S. Application Data

(60) Provisional application No. 63/412,998, filed on Oct. 4, 2022.

(51) Int. Cl.
| | | |
|---|---|---|
| *G01R 19/00* | (2006.01) | |
| *G01R 1/28* | (2006.01) | |
| *G01R 31/317* | (2006.01) | |

(52) U.S. Cl.
CPC ......... *G01R 1/28* (2013.01); *G01R 31/31728* (2013.01)

(58) Field of Classification Search
CPC ... G01R 31/28; G01R 31/31728; G01S 15/08; G01S 15/88; B66F 9/183; B66F 9/0755; B66F 9/07559; B66F 9/20; B66F 9/07; B66F 9/24; B60K 35/10; B60K 35/22; B60K 35/28
See application file for complete search history.

(56) References Cited

U.S. PATENT DOCUMENTS

| | | |
|---|---|---|
| 2,782,065 A | 2/1957 | Lord |
| 3,971,585 A | 7/1976 | LaBudde |
| 3,990,594 A | 11/1976 | Olson et al. |
| 4,201,510 A | 5/1980 | Muntjanoff |
| 4,315,428 A | 2/1982 | Stuivenwold |
| 4,422,684 A | 12/1983 | Zitzman |
| 4,431,365 A | 2/1984 | Sturtz, Jr. |
| 4,725,186 A | 2/1988 | Jerue |
| 4,997,389 A | 3/1991 | Doumani |

(Continued)

FOREIGN PATENT DOCUMENTS

CN 205087891 U 3/2016

OTHER PUBLICATIONS

Cascade Corporation, "AFC-Carton Clamp," 4 pages (2000).

(Continued)

*Primary Examiner* — Thang X Le
(74) *Attorney, Agent, or Firm* — Chernoff Vilhauer LLP

(57) ABSTRACT

Depth detector assemblies for material handling attachments are disclosed. In some embodiments, the depth detector assemblies may include at least one ultrasonic sensor removably attached to the material handling attachment. The depth detector assemblies may additionally include a controller removably attached to the material handling attachment and capable of receiving signals from the at least one ultrasonic sensor. The depth detector assemblies may further include a light display capable of being selectively illuminated by the controller to indicate depth of a load relative to the material handling attachment based on the received signals from the at least one ultrasonic sensor.

3 Claims, 4 Drawing Sheets

(56) References Cited

U.S. PATENT DOCUMENTS

| | | |
|---|---|---|
| 5,336,039 A | 8/1994 | House |
| 5,364,146 A | 11/1994 | Brandorff et al. |
| 5,984,617 A | 11/1999 | Seaberg |
| 6,027,302 A | 2/2000 | Nilson |
| 6,045,324 A | 4/2000 | Redman |
| 6,089,285 A | 7/2000 | DeStefano |
| 6,200,698 B1 | 3/2001 | Carlstrom, Jr. |
| 6,390,751 B2 | 5/2002 | Jordan et al. |
| 6,431,816 B1 | 8/2002 | Jordan et al. |
| 6,439,826 B1 | 8/2002 | Jordan et al. |
| 6,454,511 B1 | 9/2002 | Jordan et al. |
| 7,412,919 B2 | 8/2008 | Chase |
| 8,078,315 B2 | 12/2011 | McKernan et al. |
| 8,091,467 B2 | 1/2012 | Petronek |
| 9,630,821 B2 | 4/2017 | Chase |
| 10,597,272 B2 | 3/2020 | Chase |
| 2003/0159576 A1 | 8/2003 | Schoonmaker |
| 2004/0083025 A1* | 4/2004 | Yamanouchi .......... G05D 1/244 700/213 |
| 2005/0034908 A1* | 2/2005 | Raetze ................. B66F 9/0755 180/167 |
| 2006/0104781 A1 | 5/2006 | Merin |
| 2008/0100017 A1 | 5/2008 | Bitter |
| 2009/0101447 A1 | 4/2009 | Durham |
| 2009/0281655 A1 | 11/2009 | McKernan et al. |
| 2012/0174511 A1 | 7/2012 | Harding |
| 2012/0191272 A1* | 7/2012 | Andersen ............. G06Q 10/087 705/28 |
| 2013/0058746 A1 | 3/2013 | Chase |
| 2014/0240117 A1* | 8/2014 | McKernan .............. B66F 9/184 340/440 |
| 2015/0336781 A1 | 11/2015 | Neubauer |
| 2016/0052762 A1* | 2/2016 | Swift .................... B60Q 9/008 340/425.5 |
| 2017/0015537 A1* | 1/2017 | Bosworth, III ........ B60K 35/00 |
| 2017/0181378 A1 | 6/2017 | Brown, Jr. |
| 2017/0190551 A1 | 7/2017 | Chase |
| 2018/0009643 A1* | 1/2018 | Hoffman .................. B66F 9/24 |
| 2018/0155171 A1 | 6/2018 | Walthers |
| 2018/0370780 A1* | 12/2018 | Marsee ................. B66F 9/0755 |
| 2022/0063973 A1* | 3/2022 | Hamlik ................... B66F 9/183 |

OTHER PUBLICATIONS

Cascade Corporation, "D-Series Carton Clamps," 4 pages (2010).
Cascade Corporation, "Electronic Force ControlTM," 2 pages (2008).
Forkliftaction.com, "Bolzoni Auramo Intelligent Carton Clamp ETX-G3S establishes a new way to handle white goods," Newsletter #229, 2 pages (Oct. 3, 2005).
Vandehey, Cascade Corporation, "Electronic Force ControlTM," 6 pages (Aug. 2008).
Loron, Inc. "Carton Clamp," 9 pages (Jul. 2004).
International Search Report and Written Opinion RE: Application No. PCT/US2023/034490, dated Jan. 26, 2024, 9 pages.

\* cited by examiner

DEPTH DETECTOR SYSTEMS

CROSS-REFERENCE TO RELATED APPLICATIONS

This application claims the benefit of U.S. Provisional Patent Application No. 63/412,998, filed on Oct. 4, 2022 and entitled "Depth Detector Systems." The complete disclosure of the above application is hereby incorporated by reference for all purposes.

BACKGROUND

Sliding arm clamps, pivoting arm clamps, and other similar material handling attachments and/or equipment include opposed clamps or arms and are attached to and/or supported a forklift and/or other material handling equipment. One or both clamps may be slidably or pivotably connected to a load carriage. Clamp pads may be attached to and/or supported by the clamp arms. The clamps and clamp pads must be correctly positioned relative to the desired load along the direction of approach. For example, when loading a column of goods (or other load), the clamps must be correctly positioned relative to the column of goods such that the clamps do not accidentally clamp or engage the next column of goods. One way to check if the clamps are correctly positioned is for the operator or user of the forklift or material handling equipment to exit the cab, walk around, and check if the clamps are correctly positioned relative to the column of goods. Visual confirmation as described above is, however, labor-intensive and wastes valuable time.

It is desirable therefore to allow a user to determine whether the clamps have been correctly positioned relative to the desired load without requiring the user to exit the cab of the material handling equipment to visually confirm whether or not the clamps are in the correct position (such as whether or not the load is at the desired depth relative to the front tips of the clamps) or without the need to use strips on the load indicating the desired position.

BRIEF SUMMARY

Disclosed are depth detector systems or depth detector assemblies for sliding clamps, pivoting clamps, and other attachments/equipment having moving clamps or arms.

This solution allows drivers to know the position of the load with respect to the tip of the arms or clamps to avoid, for example, accidentally clamping additional load(s), such as an adjacent column of goods.

As such, in one embodiment, the solution may be the use of ultrasonic technology, and/or other detection technology, to determine the depth of the load to allow the user to determine if the load is positioned at the correct depth.

In one embodiment, a four-color LED bar is used with detection technology to inform the user of the detected or measured depth.

In one embodiment, the load may be labeled particular color(s) associated with the desired depth based on the four-color LED bar.

The foregoing and other objectives, features, and advantages of the invention will be more readily understood upon consideration of the following detailed description of the invention taken in conjunction with the accompanying drawings.

BRIEF DESCRIPTION OF THE DRAWINGS

For a better understanding of the present disclosure, and to show how the same may be carried into effect, reference will not be made, by way of examples, to the accompanying drawings, in which.

DETAILED DESCRIPTION

Figure 1:
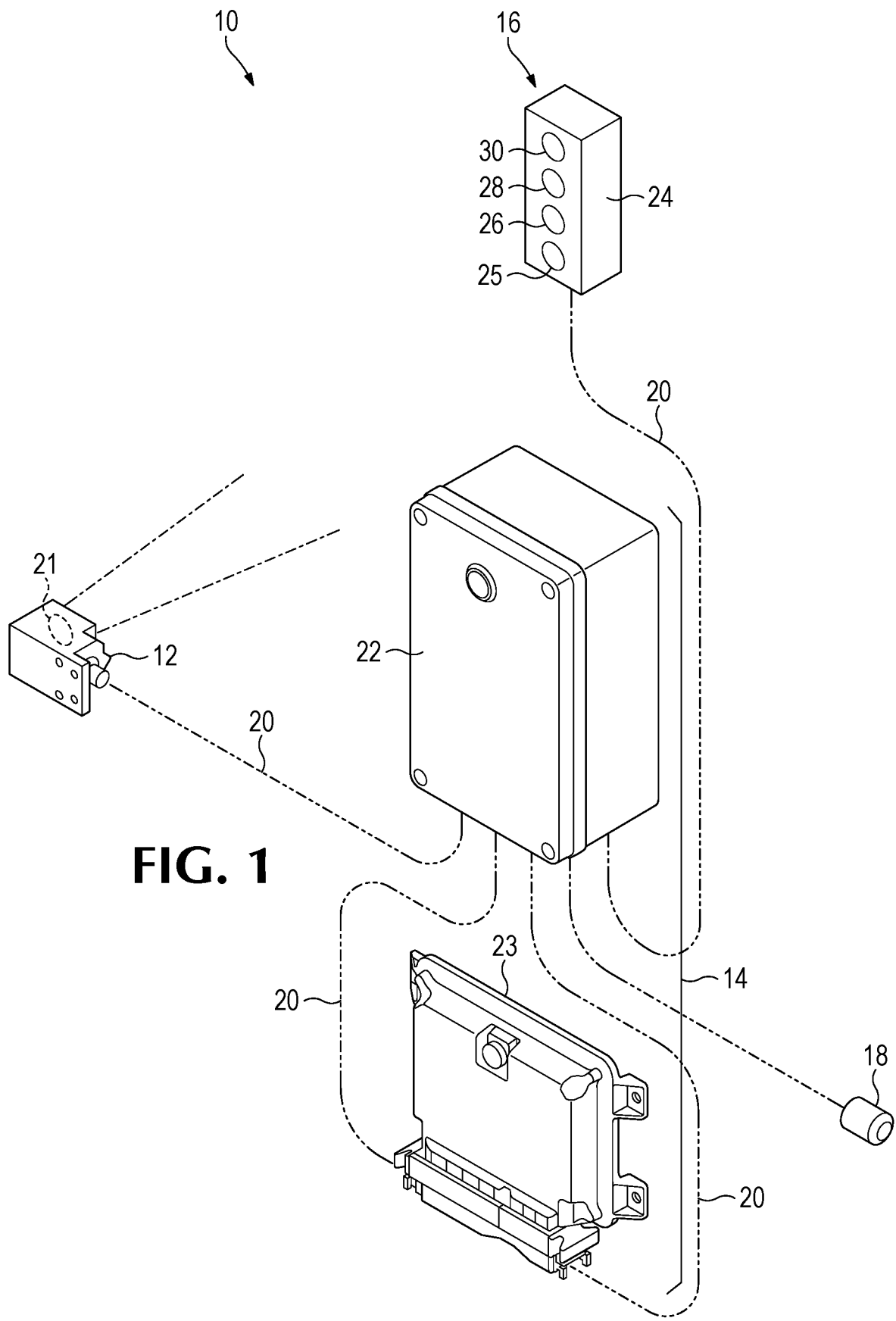
FIG. 1 shows an isometric view of an example of the depth detector assemblies of the present disclosure.

As shown in FIG. 1, a depth detector system or depth detector assembly 10 is used to alert the user as to whether a load is in the correct position for proper loading. The depth detector assembly includes an ultrasonic sensor assembly 12, a controller assembly 14, a display assembly 16, a power assembly 18, and electrical wiring 20 connecting the above assemblies.

The ultrasonic sensor assembly includes at least one ultrasonic sensor 21, such as a diffuse mode sensor that includes piezo ceramics to emit and receive ultrasonic waves. The sensor converts electrical energy to acoustic energy during transmission and then acoustic energy back to electrical energy during receiving. In some examples, the sensor may include a single transducer to both emit and receive the ultrasonic waves. The ultrasonic sensor detects, for example, the rear surface of the load relative to the tips of the clamp arms. The ultrasonic sensor avoids distortions or false readings that may result from transparent film used to wrap the load and/or different background and/or light intensities. An example of a suitable ultrasonic sensor is the UC2000-L2-I-V15 from Pepperl+Fuchs SE.

Controller assembly 14 receives signals from ultrasonic sensor assembly 12 and analyzes the timing, distortion, or absence of an echo to detect the presence or position of the load and/or measure the distance to the load. The controller assembly then transmits signals to display assembly 16 to alert the user. In the example shown in FIG. 1, controller assembly 14 includes a programmable loop controller (PLC) 22 and a control box 23 but other examples may alternatively, or additionally, include other components. Controller assembly 14 can identify a plurality of load positions based on the input from ultrasonic sensor assembly 12, such as a plurality of different load positions inside the tips of the clamps or arms. Additionally, controller assembly 14 may detect the load as it transitions from the outmost load position toward the final load position and vice versa. Moreover, the controller assembly may determine if the transition is sequential (i.e., outermost to innermost load position) or not sequential (e.g., one or more load positions are skipped). Furthermore, controller assembly 14 may determine the minimum of load positions the load must transition to until the final load position is reached. In some examples, the controller assembly may specifically exclude one or more of the detection and/or determination features described above. An example of a suitable controller assembly is TTControl's TTC 50 Controller.

Display assembly 16 is mounted in the cab or adjacent to the cab (e.g., attached to one or more frame members that make up the cab) where the assembly is visible to the user.

In the example shown in FIG. 1, the display assembly includes four different colored lamps (e.g., light emitting diodes). Controller assembly 14 sends signals to display assembly 16 based on and/or in response to the detected load position by the ultrasonic sensor assembly to selectively illuminate one or more lights of the light display of the display assembly. In the example shown in FIG. 1, the display assembly includes a light bar or light display 24 having a blue LED 25, a green LED 26, an orange LED 28, and a red LED 30. However, other colors and/or other light sources may be used. The controller assembly may selectively illuminate one or more of the LEDS based on the detected position. Additionally, the illumination may be constant or intermittent based on the detected position. Moreover, the controller assembly may selectively illuminate one or more lights of the light display based on one or more other determinations, such as described above for detecting transitions, minimum transitions, etc. Furthermore, other examples of the depth detector assemblies may alternatively, or additionally, include other visual indicators (e.g., display screen, non-LED lights, etc.) and/or audio indicators (e.g., buzzer, speaker, etc.).

Power assembly 18 may include any suitable structure configured to provide power to the other assemblies of depth detector assembly 10. In the example shown in FIGS. 1-3, power assembly 18 includes a power coupler 46 that is connectable to a power supply of the forklift and/or other material handling equipment. Other components of the depth detector assemblies may include various wires, connectors, tower harness, etc.

Figure 2:
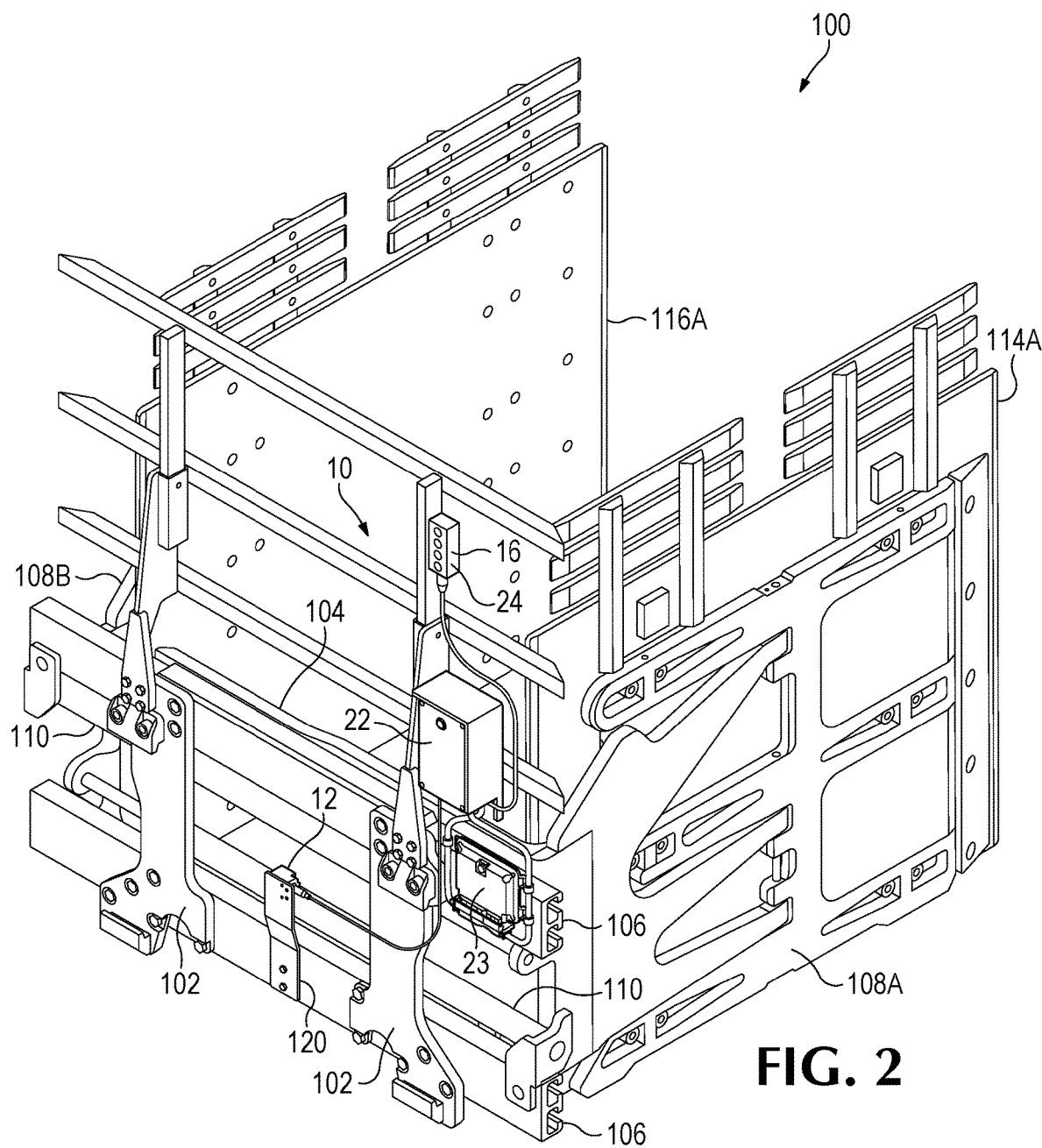
FIG. 2 is an isometric view of an example of a clamp assembly with the depth detector assembly of FIG. 1 installed.
Figure 3:
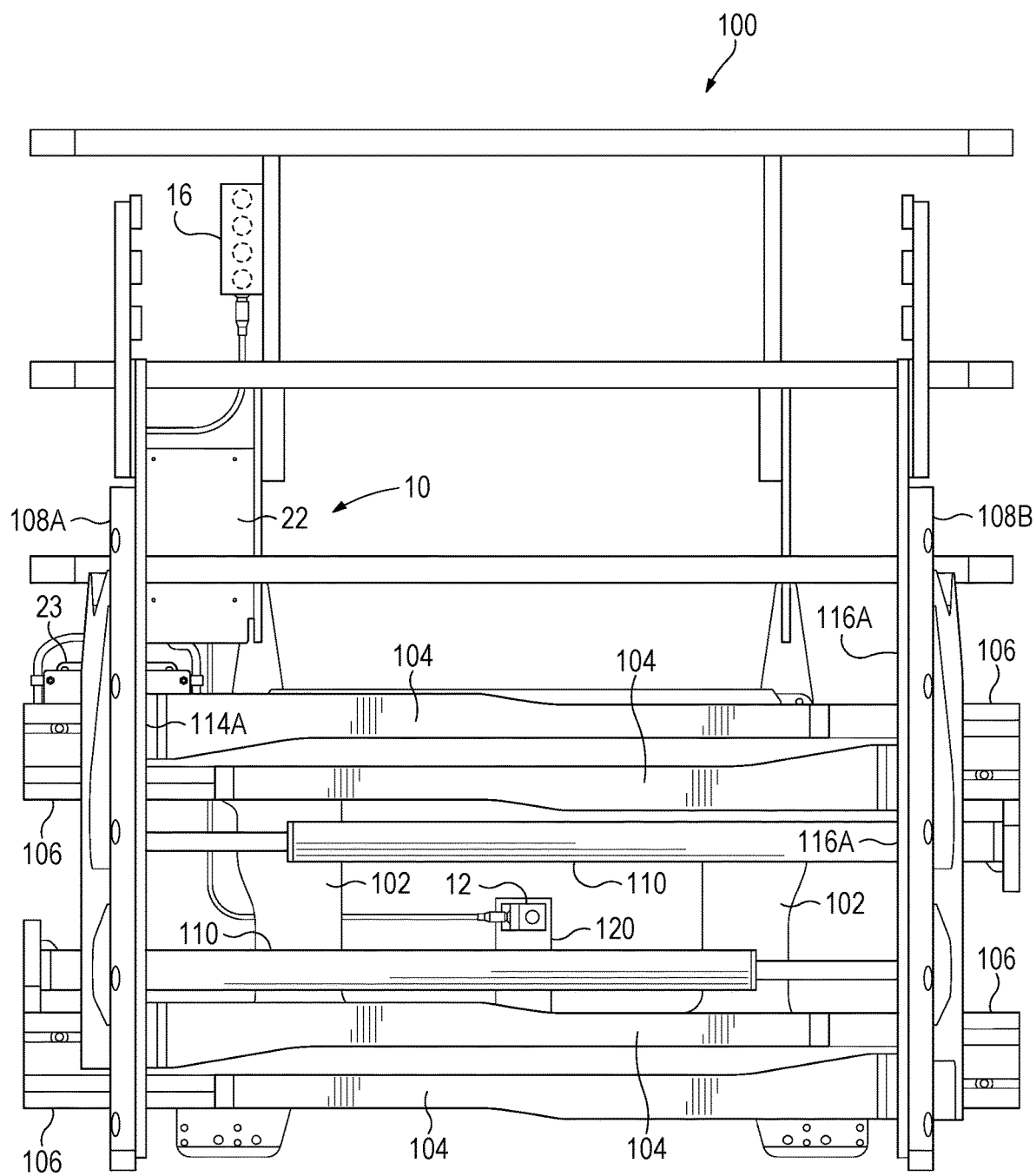
FIG. 3 is a front view of the clamp assembly of FIG. 2 with the depth detector assembly of FIG. 1 installed.

Referring to FIGS. 2-3, depth detector assembly 10 is installed on an illustrative clamping assembly 100. Clamping assembly 100 includes a mounting plate 102 by which the clamping assembly can be removably coupled to a load-carrying vehicle, i.e., a lift truck or other type of vehicle. Clamping assembly 100 has a first clamp arm 108A and an opposing second clamp arm 108B that are controllably movable relative to each other, e.g., to engage sides of a load and, with appropriate applied force, to lift and move the load. In the illustrated implementations, the clamp arms 108A, 108B are shown in a generally upright orientation, and thus the first clamp arm 108A is also referred to as the left clamp arm, and the second clamp arm 108B is referred to as the right clamp arm. Additional aspects of clamping assemblies are described in commonly owned U.S. Pat. Nos. 9,630,821 and 7,412,919, the complete disclosures of which are hereby incorporated by reference for all purposes.

The clamp arms 108A, 108B are moved relative to each other using hydraulic force applied through one or more hydraulic cylinders, such as the pair of opposed hydraulic cylinders 110 as shown in FIGS. 2-3. The hydraulic cylinders 110 allow for controllably moving the clamp arms 108A, 108B, as well as applying force to a load once the clamp arms 108A, 108B have contacted and engaged the load. In the illustrated implementation, each of the clamp arms 108A, 108B has a pair of slide arms 106 that are slidably supported on stationary guide bars 104 extending horizontally from the mounting plate 102. Thus, there are a total of four slide arms 106 and four horizontal guide bars 104. The slide arms 106 and the guide bars 104 support the clamp arms 108A, 108B in any position over their range of travel and provide for smoothly guided movement between positions. Additional supports, such as the support rails 112, can be configured as shown to provide support for the load and prevent the load from moving rearward.

Clamp arm 108B is configured for use with a first clamping pad 114B and a separate second clamping pad 116B positioned adjacent the first clamping pad 114B. Similarly, clamp arm 108A is similarly configured with a first clamping pad 114A and a second clamping pad 116A. The clamping pads are typically made of a resilient material supported by a relatively rigid substrate, such as a rubber coating applied over an aluminum plate. The clamp arms 108A, 108B preferably have multiple clamping zones, such as three clamping zones.

As shown in FIGS. 2-3, depth detector assembly 10 is attached and/or mounted to clamping assembly 100. For example, ultrasonic sensor assembly 12 is attached to a lower guide bar 104 via a bracket 120 with the sensor facing the space between clamp arms 108A, 108B. Controller assembly 14 is attached to an upper guide bar 104 and includes a control box 50 and a programmable logic controller (PLC) 52. Display assembly 16 is attached to an upper guide bar 104 and faces the user sitting in a cab of the material handling equipment. Alternatively, the display assembly may be attached to one or more members of the cab of the material handling equipment (e.g., lift truck) or any suitable part of the material handling equipment. Power assembly 18 includes power coupler 46 that is coupled to the power source of the material handling equipment.

In some embodiments, the depth detector assemblies may be coupled with a Volumetric Force Control (VFC) system that automatically adjusts clamping pressure based on volume of the load or an Automatic Pressure Control (APC) system that automatically adjusts clamping pressure based on load width only. The load and/or clamp pads may have a color label or other color indicator associated with the desired detection position or desired depth.

Figure 4:
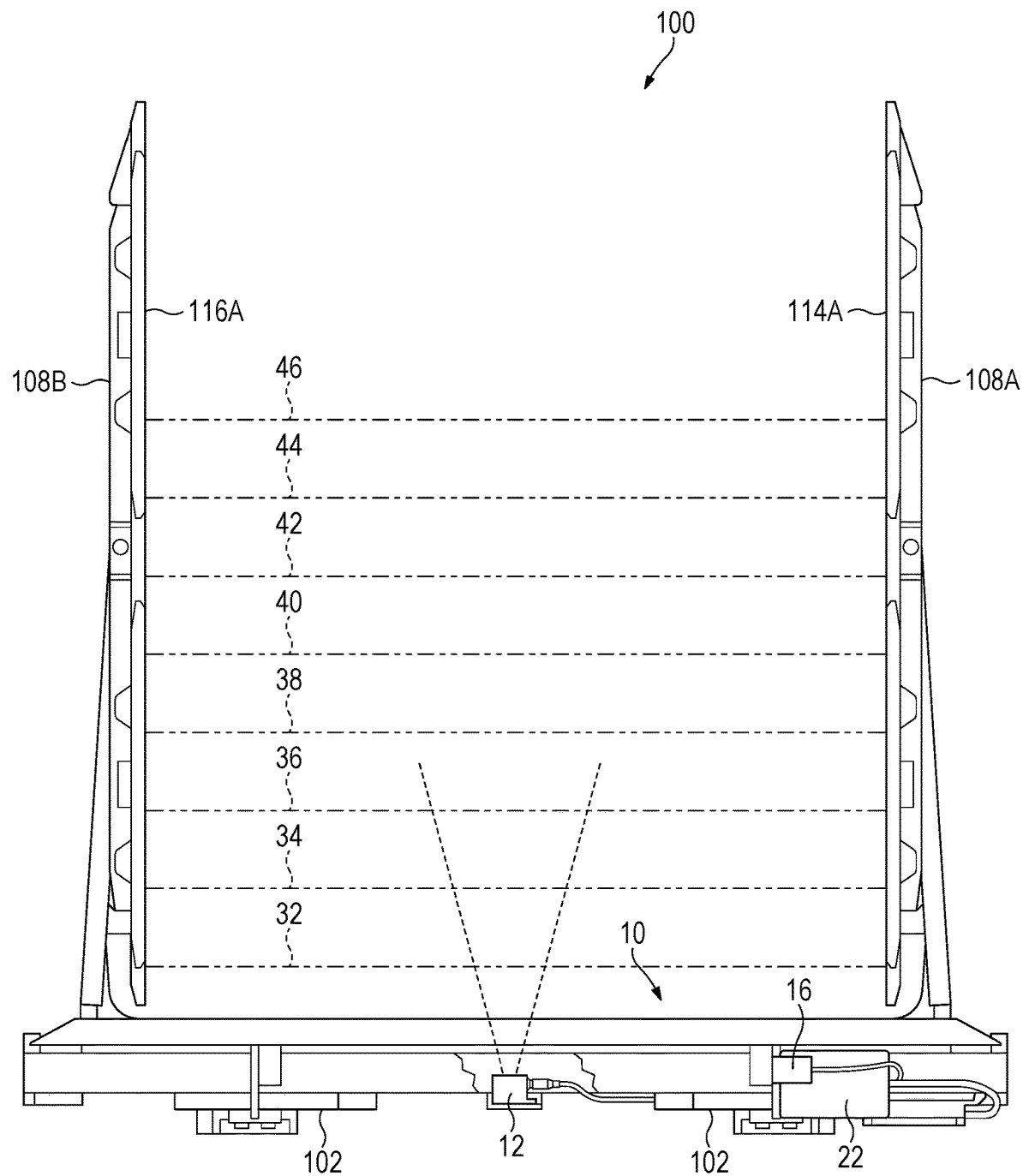
FIG. 4 shows examples of detection zones of the depth detector assembly of FIG. 1.

An example is shown in FIG. 4 of indicating load position by selective illumination of one or more lights of the light display. For example, blue LED 25 is constantly illuminated (fixed) when the load is in detection position 32, green LED 26 is constantly illuminated (fixed) when the load is in detection position 34, orange LED 28 is constantly illuminated (fixed) when the load is in detection position 36, red LED 30 is constantly illuminated (fixed) when the load is in detection position 38, the blue LED is intermittently illuminated (blinking) when the load is in detection position 40, the green LED is intermittently illuminated (blinking) when the load is in detection position 42, the orange LED is intermittently illuminated (blinking) when the load is in detection position 44, and the red LED is intermittently illuminated (blinking) when the load is in detection position 46. Although only a single LED is illuminated per load position as described above, other embodiments of the depth detector assemblies may include selective illumination of two or more LEDs based on, or in response to, the detected load position.

Some embodiments provide methods of detecting depth of a load relative to a material handling attachment. The methods may include detecting proximity of the load via an ultrasonic sensor. In some embodiments, only the current proximity of the load is detected and/or when the load has stopped moving relative to the material handling attachment. In other embodiments, the detecting is performed while the load is moving relative to the material handling attachment. Additionally, the methods may include displaying the proximity of the load via, for example, a light display based on or in response to the detected proximity of the load. The displaying may include displaying the proximity of the load via selective illumination of one or more (or only one) of the lights of the light display. Moreover, the methods may include detecting the load as the load moves or transitions across a plurality of load positions of different depths.

Furthermore, the methods may include determining the minimum number of the above transitions for a particular load, and/or determining whether the transitions are sequential or are not sequential. In some examples, the methods may specifically exclude one or more of the above detecting and/or determining steps. The methods may include installing the components of the depth detector assemblies described above, which may include attaching the sensor assembly to face the load, attaching the controller assembly adjacent to the sensor assembly, attaching the display assembly proximate to the user of the material handling equipment, and/or connecting the controller assembly to a power source of the material handling equipment.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

What is claimed is:

1. A clamping assembly, comprising:
   a mounting plate capable of being removably coupled to a load-carrying vehicle;
   a plurality of guide bars extending horizontally from the mounting plate;
   a plurality of slide arms slidably supported on the plurality of guide bars;
   first and second opposing clamp arms each attached to corresponding slide arms of the plurality of slide arms, the first and second clamp arms being movable towards and away from each other to contact and exert a clamping force on a load sufficient for lifting and transporting the load;
   an ultrasonic sensor attached to one or more of the guide bars and directed toward a space defined between the first and second opposing clamp arms, wherein the ultrasonic sensor is a diffuse mode sensor;
   a controller attached to one or more of the guide bars and capable of receiving signals from the at least one ultrasonic sensor; and
   a light display capable of being selectively illuminated by the controller to indicate depth of a load relative to the material handling attachment based on the received signals from the at least one ultrasonic sensor, wherein the light display is capable of being selectively illuminated by the controller to indicate only the depth of the load relative to the material handling attachment based on the received signals from the at least one ultrasonic sensor, and wherein the light display is mounted on one or more of the guide bars facing away from the clamp arms.

2. The clamping assembly of claim 1, wherein the light display includes a plurality of light emitting diodes.

3. The clamping assembly of claim 2, wherein each light emitting diode of the plurality of light emitting diodes is associated with a corresponding detection position for the load.

* * * * *